United States Patent
Adachi et al.

(10) Patent No.: US 9,400,556 B2
(45) Date of Patent: Jul. 26, 2016

(54) ELECTRONIC DEVICE

(71) Applicant: Panasonic Corporation, Osaka (JP)

(72) Inventors: Yusuke Adachi, Osaka (JP); Ryo Okumura, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 359 days.

(21) Appl. No.: 13/863,330

(22) Filed: Apr. 15, 2013

(65) Prior Publication Data

US 2013/0229384 A1    Sep. 5, 2013

Related U.S. Application Data

(63) Continuation of application No. PCT/JP2012/006414, filed on Oct. 5, 2012.

(30) Foreign Application Priority Data

Oct. 17, 2011  (JP) ................... 2011-227531

(51) Int. Cl.
  *G06F 3/01*   (2006.01)
  *G06F 3/0488*   (2013.01)
  *G06F 3/041*   (2006.01)

(52) U.S. Cl.
  CPC ............... *G06F 3/016* (2013.01); *G06F 3/041* (2013.01)

(58) Field of Classification Search
  CPC ............... G06F 3/016; G06F 3/03547; H03K 2217/94036
  USPC ............... 310/317, 323.02, 323.16; 318/116; 345/173
  See application file for complete search history.

(56) References Cited

U.S. PATENT DOCUMENTS

| | | | |
|---|---|---|---|
| 2002/0149561 A1 | 10/2002 | Fukumoto et al. | |
| 2004/0168516 A1 | 9/2004 | Kent | |
| 2006/0097996 A1* | 5/2006 | Tabata | G06F 3/016 345/173 |
| 2009/0227295 A1* | 9/2009 | Kim | 455/566 |
| 2009/0284485 A1* | 11/2009 | Colgate | G06F 3/016 345/173 |
| 2011/0115734 A1 | 5/2011 | Harashima et al. | |

(Continued)

FOREIGN PATENT DOCUMENTS

| | | |
|---|---|---|
| JP | 2005-258666 A | 9/2005 |
| JP | 2006-139371 A | 6/2006 |

(Continued)

OTHER PUBLICATIONS

International Search Report for corresponding International Application No. PCT/JP2012/006414 mailed Dec. 11, 2012.

(Continued)

*Primary Examiner* — Lin Li
(74) *Attorney, Agent, or Firm* — Renner, Otto, Boisselle & Sklar, LLP

(57) ABSTRACT

An electronic device 100 includes a touch panel 102 for accepting a touch operation by a user to detect a touch position, a vibrating section 203 for vibrating the touch panel 102 in a first vibration mode and a second vibration mode, and a vibration control section 301 for controlling the vibration of the vibrating section 203. The number of vibration nodes occurring on the touch panel 102 in the first vibration mode is different from the number of vibration nodes occurring on the touch panel 102 in the second vibration mode. The vibration control section 301 vibrates the touch panel 102 in at least one of the first vibration mode and the second vibration mode depending on the touch position of the user.

16 Claims, 8 Drawing Sheets

(56) References Cited

U.S. PATENT DOCUMENTS

| | | | |
|---|---|---|---|
| 2011/0291976 A1 | 12/2011 | Takada et al. | |
| 2012/0293435 A1* | 11/2012 | Miki | G06F 3/016 345/173 |
| 2015/0084914 A1* | 3/2015 | Kuroki | G06F 3/0488 345/174 |

FOREIGN PATENT DOCUMENTS

| | | |
|---|---|---|
| JP | 2010-178221 | 8/2010 |
| JP | 2010-238222 A | 10/2010 |
| JP | 2011-090575 A | 5/2011 |
| JP | 2011-129091 A | 6/2011 |

OTHER PUBLICATIONS

Form PCT/ISA/237 for corresponding International Application No. PCT/JP2012/006414 dated Dec. 11, 2012 and Partial English Translation.

\* cited by examiner f00 MODE f10 MODE f01 MODE f20 MODE

ELECTRONIC DEVICE

This is a continuation of International Application No. PCT/JP2012/006414, with an international filing date of Oct. 5, 2012, which claims priority of Japanese Patent Application No. 2011-227531, filed on Oct. 17, 2011, the contents of which are hereby incorporated by reference.

BACKGROUND

1. Technical Field

The present disclosure relates to an electronic device including a touch panel.

2. Description of the Related Art

In recent years, electronic devices having a touch panel on the surface of a display as an input means have been widely used. One of the operation principles of the touch panel is the capacitive type. With this type, a touch position of a fingertip of the user on the touch panel is detected by sensing a change in the capacitance between the fingertip of the user and a conductive film of the touch panel.

Typically, with an electronic device including a touch panel, an input operation is performed by the user directly contacting the touch panel surface. Even if there is a change in the capacitance upon contacting the touch panel surface, it has not been possible for the user to perceive it as a tactile sensation. Therefore, it has not been possible for the user to determine, through the tactile sensation at the fingertip, whether an input operation has been performed correctly. This has been stressful for the user.

For example, a ticket vending machine at a train station, an automated teller machine, or the like, is operated by touching GUI buttons displayed on the screen, but it is difficult for the user to determine whether the user has pressed a correct position of a GUI button because the tactile sensation is the same between a position which is a GUI button and a position which is not a GUI button. Japanese Laid-Open Patent Publication No. 2010-238222 discloses a touch panel device in which a vibration is set for a position at which a GUI button is displayed. This touch panel device vibrates a position at which a GUI button is displayed and does not vibrate a position at which a GUI button is not displayed. The user can recognize whether or not a GUI button is being pressed correctly by feeling a vibration when the user presses a position at which a GUI button is displayed and not feeling a vibration when the user presses a position at which a GUI button is not displayed.

SUMMARY

The present disclosure provides an electronic device in which it is possible to reduce variation in tactile sensation between different touch positions.

An electronic device according to the present disclosure includes: a panel member touched by a user; a vibrating section for vibrating a panel member in a first vibration mode and a second vibration mode; and a vibration control section for controlling the vibration of the vibrating section, wherein: the number of vibration nodes occurring on the panel member in the first vibration mode is different from the number of vibration nodes occurring on the panel member in the second vibration mode; and the vibration control section vibrates the panel member in at least one of the first vibration mode and the second vibration mode depending on a touch position of the user.

With an electronic device according to the present disclosure, it is possible to reduce variation in tactile sensation between different touch positions.

DETAILED DESCRIPTION

Figure 1:
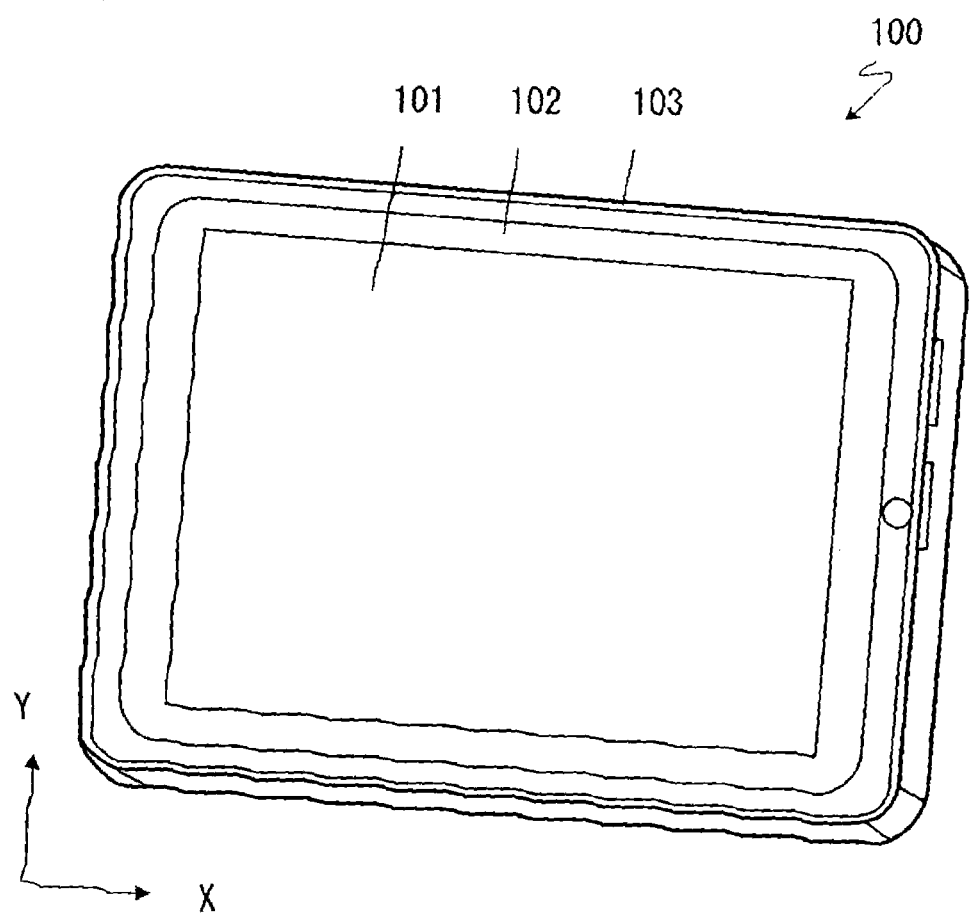
FIG. 1 is an external perspective view of an electronic device according to an embodiment.

An embodiment will now be described in detail, referring to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventors provide the accompanying drawings and the following description in order for a person of ordinary skill in the art to sufficiently understand the present disclosure, and they are not intended to limit the subject matter set forth in the claims.

1. Configuration of Electronic Device

FIG. 1 is a perspective view showing an external view of the display surface side of an electronic device 100 according to an embodiment. The electronic device 100 includes a display section 101, a touch panel 102 arranged so as to cover the display section 101, and a casing 103. For the purpose of illustration, the long-side direction of the touch panel 102 will be referred to as the X direction, and the short-side direction thereof as the Y direction.

Figure 2:
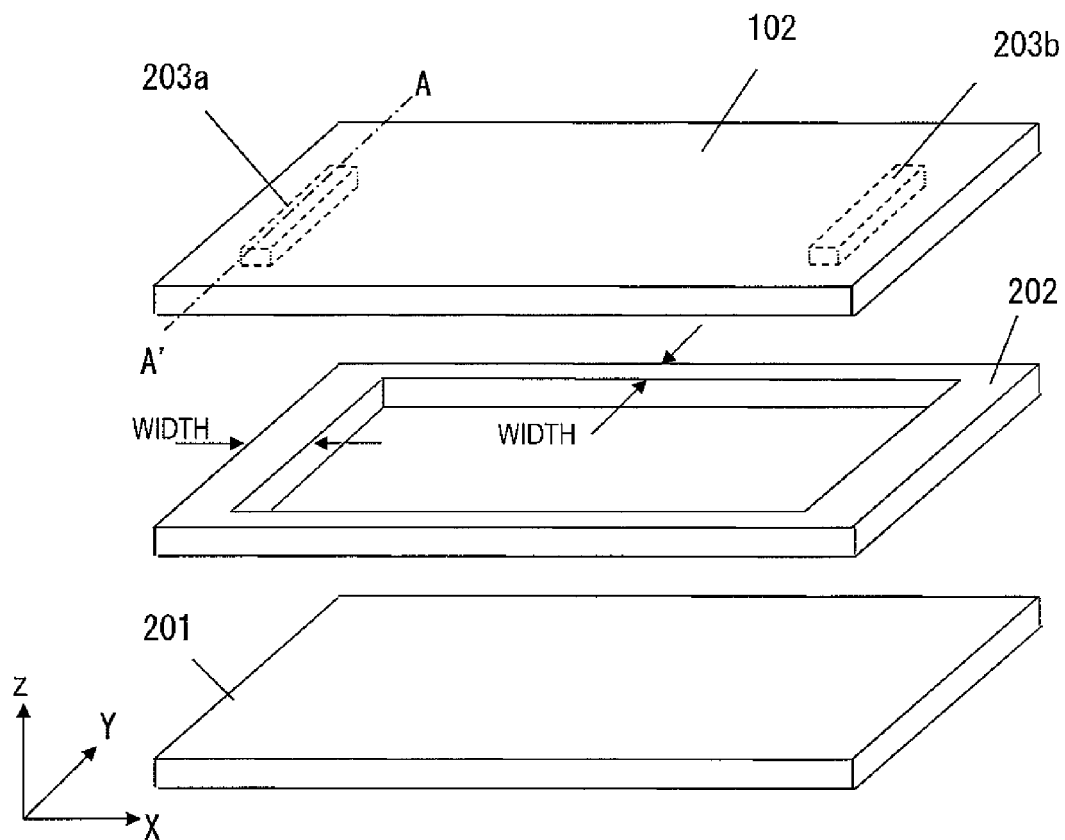
FIG. 2 is an exploded perspective view showing an electronic device according to an embodiment.

FIG. 2 is an exploded perspective view showing the electronic device 100. As shown in FIG. 2, the electronic device 100 includes a base material 201, the touch panel 102, a support section 202, and a vibrating section 203. The base material 201 is a member to be the base for supporting the touch panel 102. The base material 201 is a metal, a resin, or the like, having such a rigidity that it can support the touch panel 102, etc. A display panel and a circuit board, which are not shown, are attached to the base material 201.

The touch panel 102 accepts a touch operation by the user to detect a touch position. The method of position detection of the touch panel 102 may be any of known methods, such as pressure-sensitive, capacitive, optical, and surface acoustic wave. The touch panel 102 is an example of a panel member. A circumferential portion of the touch panel 102 is supported by the support section 202.

The support section 202 is provided along substantially the entire circumferential portion of the touch panel 102, and supports the touch panel 102 against the base material 201. The support section 202 is formed by a material having some strength and elastic force, such as a resin, a rubber or a gel. The support section 202 may be formed by a metal, or the like. With such a configuration, it is possible to increase the strength of the support section 202. The support section 202 may be formed by a spring element. With such a configuration, the support section 202 can have a high elastic force.

The support section 202 is formed by four sides. Specifically, it is formed by two opposing long sides and two opposing short sides in conformity with the shape of the electronic device 100. The width of the support section 202 is narrower along the long sides than along the short sides. As a result, the rigidity of the support section 202 is lower along the long sides than along the short sides.

Note that while the base material 201 and the support section 202 are provided as separate members in the present embodiment, the base material 201 and the support section 202 may be formed as an integral member.

While the support section 202 connects together the base material 201 and the touch panel 102 along the entire circumference in the present embodiment, it may be along parts of the circumference.

The electronic device 100 of the present embodiment includes two vibrating sections 203a and 203b. The vibrating sections 203a and 203b are attached to circumferential portions on the reverse surface of the touch panel 102. The vibrating sections 203a and 203b are each arranged in the vicinity of generally the middle point of a short side of the touch panel 102. The vibrating sections 203a and 203b vibrate the touch panel 102 to give a tactile sensation to the user. For example, the vibrating sections 203a and 203b may be piezoelectric elements, vibration motors, linear actuators, voice coil motors, artificial muscles, or the like. In essence, the vibrating sections 203a and 203b may be any portions capable of converting an electric energy, or the like, into a vibration energy.

Figure 3:
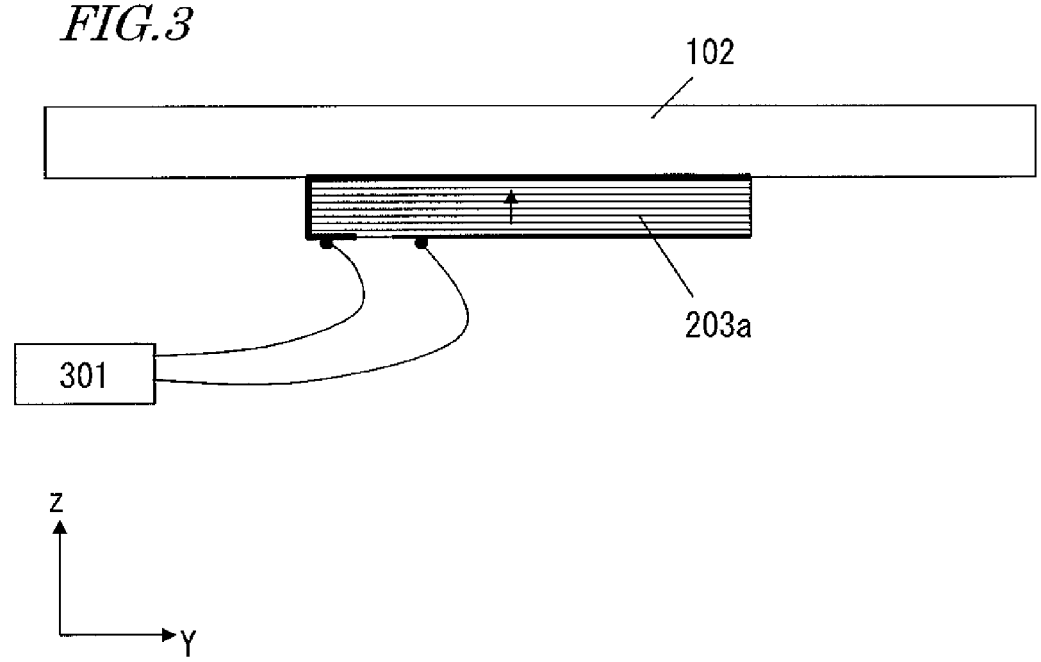
FIG. 3 is a cross-sectional view of an electronic device according to an embodiment taken along line A-A' shown in FIG. 2.

FIG. 3 is a cross-sectional view of the touch panel 102 and the vibrating section 203a of the electronic device 100 taken along line A-A' shown in FIG. 2. As shown in FIG. 3, the vibrating section 203a is physically connected to the touch panel 102. The vibrating section 203a is electrically connected to a vibration control section 301. In this example, the vibrating section 203a is a piezoelectric element with electrodes formed on both surfaces thereof. The electrode on the side connected to the touch panel 102 is electrically connected to the vibration control section 301 via the end face of the piezoelectric element. By applying an alternating-current voltage by means of the vibration control section 301, the vibrating section 203a expands and contracts, thereby causing a flexural vibration on the touch panel 102.

Note that while an example has been shown herein in which the vibrating sections 203a and 203b are physically connected to the touch panel 102, the vibrating sections 203a and 203b do not need to be connected directly to the touch panel 102, but may be connected to a member other than the touch panel 102 as long as the touch panel 102 can be vibrated.

2. Vibration of Touch Panel

When the touch panel 102 is vibrated, there are a location of a large amplitude (the antinode of vibration of a standing wave) and a location of a small amplitude (the node of vibration of a standing wave) on the touch panel 102. If the touch position of the user is a node portion of a small amplitude, the user cannot feel the vibration of the touch panel 102, failing to convey the information of the vibration to the user. If the magnitude of the vibration to be felt varies between different touch positions, the user feels awkward about the operation. The electronic device 100 reduces variation in tactile sensation between different touch positions by setting a vibration depending on the touch position.

Figure 4A:
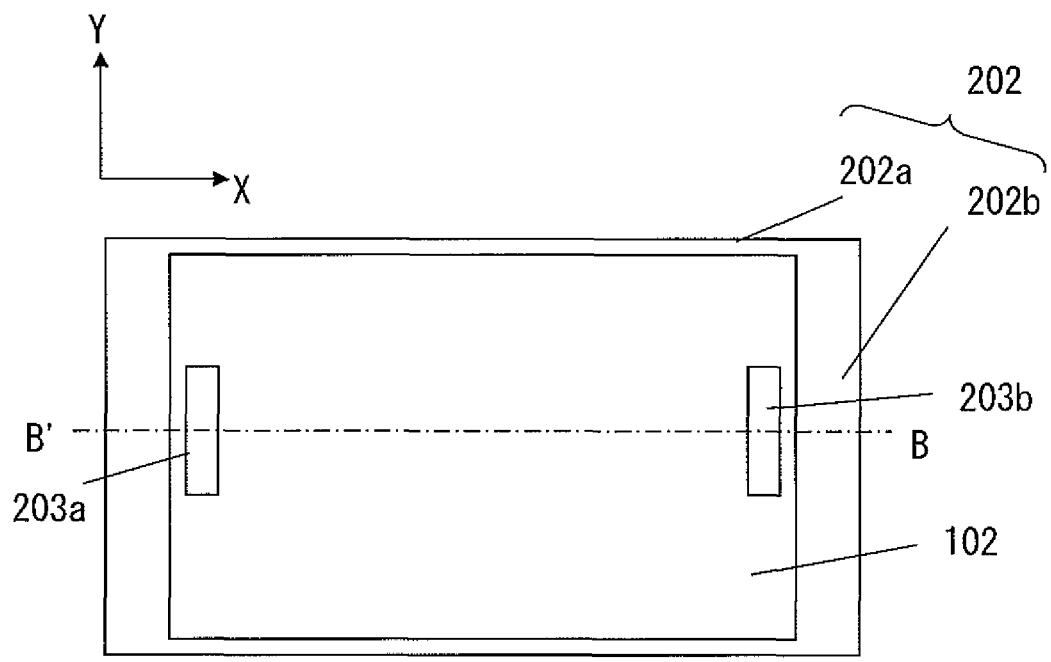
FIG. 4A is a plan view showing a display section of an electronic device according to an embodiment.

FIG. 4A is a plan view of the display section 101 the electronic device 100. The support section 202 includes a support section 202a extending in the X direction, and a support section 202b extending in the direction (the Y direction) perpendicular to the support section 202a. In this example, the rigidity of the support section 202a in the X direction is lower than the rigidity of the support section 202b in the Y direction.

Figure 4B:
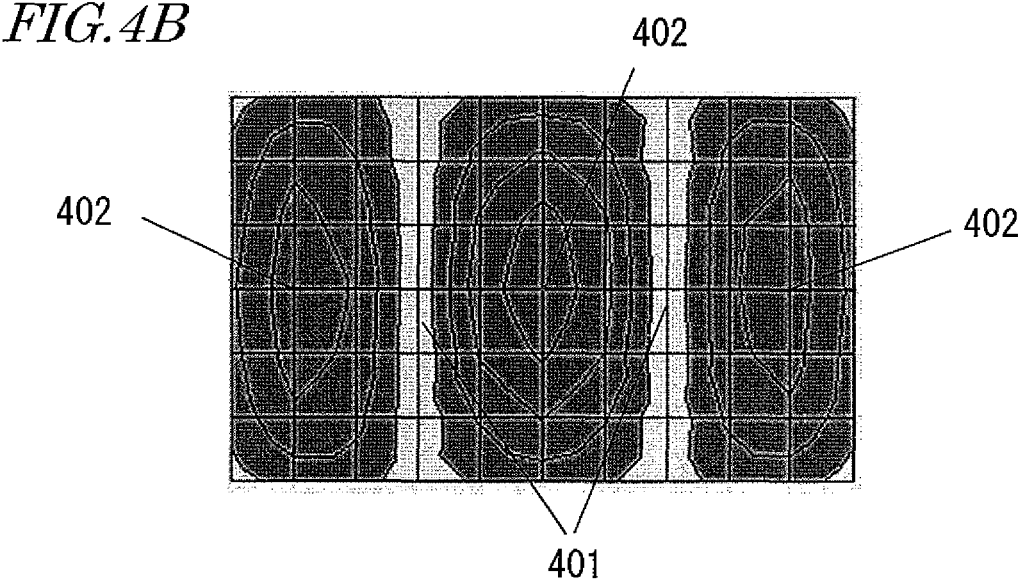
FIG. 4B is a vibration distribution map of a touch panel when a vibrating section according to an embodiment is driven at a certain frequency.

FIG. 4B shows a vibration amplitude distribution on the touch panel 102 when sinusoidal waves of a voltage of 150 Vpp and a frequency of 220 Hz are applied in phase to the piezoelectric elements of the vibrating sections 203a and 203b via the vibration control section 301. The magnitude of the amplitude of the vibration is represented by contour lines. In the X direction, there are three locations of a large amplitude (hereinafter "vibration antinodes 402") and two locations of a small amplitude (hereinafter "vibration nodes 401") excluding the opposite end portions. In the Y direction, there is no vibration node 401 except for the opposite end portions. Such a vibration mode is referred to as f20 (the first figure attached to f is the number of nodes in the X direction, and the second figure attached thereto is the number of nodes in the Y direction). In the present embodiment, since the support section 202 is formed along the entire circumference, the touch panel 102 will have a flexural vibration with both ends fixed. Note that a vibration other than a flexural vibration with both ends fixed may be used.

Figure 4C:
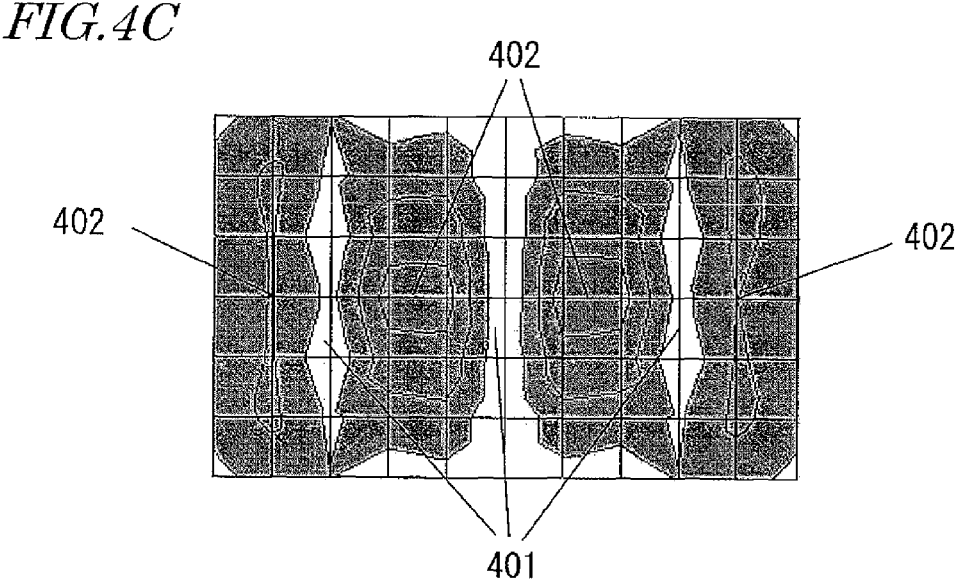
FIG. 4C is a vibration distribution map of a touch panel when a vibrating section according to an embodiment is driven at another frequency.

FIG. 4C shows a vibration amplitude distribution on the touch panel 102 when sinusoidal waves of a voltage of 150 Vpp and a frequency of 370 Hz are applied in antiphase to the piezoelectric elements of the vibrating sections 203*a* and 203*b* via the vibration control section 301. Herein, antiphase refers to the vibration control section 301 performing a control such that the vibrating section 203*b* contracts when the vibrating section 203*a* expands, for example. Specifically, reverse voltages are applied to the piezoelectric elements. In such a case, there are four vibration antinodes 402 and three vibration nodes 401 in the X direction. Such a vibration mode is referred to as the f30 mode.

The number of vibration nodes 401 occurring on the touch panel 102 when vibrating in the f20 mode (FIG. 4B) is different from the number of vibration nodes 401 occurring on the touch panel 102 when vibrating in the f30 mode (FIG. 4B). Therefore, the positions of the nodes 401 on the touch panel 102 in the f20 mode are different from the position of the nodes 401 on the touch panel 102 in the f30 mode. The positions of the vibration antinodes 402 occurring on the touch panel 102 in the f20 mode are also different from the positions of the vibration antinodes 402 occurring on the touch panel 102 in the f30 mode.

Figure 4D:
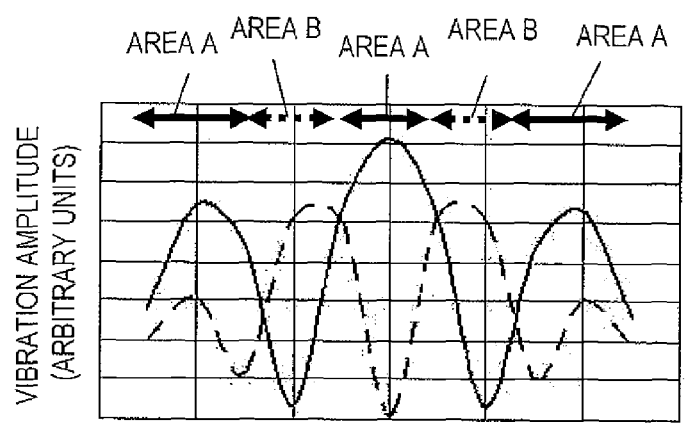
FIG. 4D is a vibration intensity diagram of a touch panel of an electronic device according to an embodiment taken along line B-B' shown in FIG. 4A.

FIG. 4D shows a vibration amplitude distribution along line B-B' of FIG. 4A. The solid line represents the f20 mode (FIG. 4B), and the dotted line represents the f30 mode (FIG. 4C). The vibration control section 301 controls the vibration waveform in accordance with the touch position of the user. Specifically, when the touch position of the user is within a range of area A of FIG. 4D, the vibration control section 301 controls the vibration waveform so as to induce the f20 mode on the vibrating section 203. When the touch position of the user is within a range of area B of FIG. 4D, the vibration control section 301 controls the vibration waveform so as to induce the f30 mode on the vibrating section 203. The vibration control section 301 vibrates the touch panel 102 while selecting a vibration mode, between the f20 mode and the f30 mode, in which the position of the vibration node 401 is farther away from the touch position of the user. Note that the vibration control section 301 may vibrate the touch panel 102 while selecting a vibration mode, between the f20 mode and the f30 mode, in which the position of the vibration antinode 402 is closer to the touch position of the user. By such a control, the user can feel a vibration wherever the user touches on the touch panel 102.

Figure 4E:
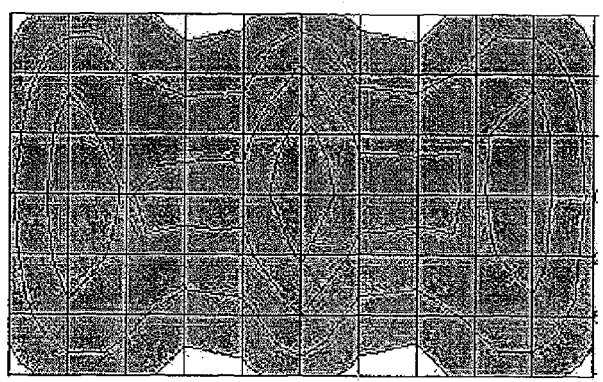
FIG. 4E is a vibration distribution map of a touch panel where a drive frequency is changed depending on the touch position according to an embodiment.

FIG. 4E is a vibration distribution map where the drive frequency is changed depending on the touch position of the user. Since one of the f20 mode and the f30 mode that has a greater vibration at the touch position of the user is output, it is possible to present, to the user, a great vibration across the entire area of the touch panel 102.

While two vibration modes are used in the present embodiment, the present invention is not limited thereto. That is, more then two vibration modes may be used. In such a case, for example, one of the plurality of vibration modes that gives the greatest vibration at the touch position is used.

When selecting vibration modes to be used, frequencies may be selected that are easily felt and not easily heard by a human, in addition to considering the uniformity of vibration. Frequencies that are easily felt as a tactile sensation by a human are 100 to 500 Hz, more specifically 200 to 400 Hz. Since noise may occur due to the vibration of the panel if the frequency is over 500 Hz, a frequency of 500 Hz or less, e.g., 400 Hz or less, is used. Where a plurality of vibration modes are switched from one to another, if the drive frequencies are excessively different from one another, there will be awkwardness in tactile sensation, and therefore it is preferred to use drive frequencies close to one another. Note that if the frequency and the voltage are set so that the amplitude on the touch panel 102 is about 5 to 50 μm, it is possible to present a comfortable tactile sensation (vibration) to a finger of a human.

Regarding the position at which the vibrating section 203 is arranged on the touch panel 102, it is preferred to arrange it at a location where the vibration amplitude is large in the vibration mode used by the touch panel 102. In the case of FIG. 4B, although it is preferred to provide vibrating sections 203 at three locations which are the vibration antinodes, the vibrating sections 203 are not normally transparent, and it blocks the display of the display section 101 on the reverse side if it is arranged in the central portion of the touch panel. Therefore, the vibrating sections 203 are arranged at the end portions of the touch panel 102. For example, they are each arranged outside the display area of the display section 101 and in the range of the touch panel 102. Note that although the vibrating sections 203 have been described to be arranged at the end portions of the touch panel 102, they can be arranged, with no problems, slightly inside the end portions as long as they are outside the display area. Also in such a case, they are preferably arranged at end portions closer to vibration antinodes. It is possible that the vibrating sections 203 are arranged in the central portion of the touch panel 102 in the Y direction and at the end portions thereof in the X direction (the arrangement of FIG. 4A), or arranged at three locations close to the vibration antinodes in the X direction and at the end portions of the touch panel 102 in the Y direction (the f20 mode).

Also with the arrangement positions of the vibrating sections 203 for the f30 mode, the vibrating sections 203 are preferably arranged close to the positions of the antinodes of vibration amplitude. Therefore, it is possible that they are arranged in the central portion of the touch panel 102 and at the end portions thereof in the X direction, or at four locations on the touch panel 102 close to vibration antinodes in the X direction and at the end portions in the X direction.

In this example, since the f20 mode and the f30 mode are switched from one to another depending on the touch position, the vibrating sections 203 are arranged in the vicinity of the positions of the vibration antinodes in the f20 mode and those in the f30 mode. More specifically, the vibrating sections 203 are arranged at positions that are closer to vibration antinodes in the f20 mode and those in the f30 mode than to vibration nodes in the f20 mode and those in the f30 mode. Since it is desirable, in view of the cost, to generate vibrations with as few vibrating sections 203 as possible, the vibrating sections 203 are arranged in the central portion of the touch panel 102 in the Y direction and at the end portions thereof in the X direction (the arrangement of FIG. 4A), which is suitable for both vibration modes.

While the example above is a configuration with fewest vibrating sections 203, the vibrating sections 203 may be provided at more than two locations. The positions at which the vibrating sections 203 are arranged may be in the central portion in the X direction and at the end portions in the Y direction, instead of in the central portion in the Y direction and at the end portions in the X direction. They may be arranged at asymmetric positions, instead of symmetric positions, as long as they are arranged at portions close to antinodes of the mode of vibration.

Where amplitudes in antiphase are induced as shown in FIG. 4C, the drive phase needs to be changed depending on the locations where the vibrating sections 203 are arranged. Specifically, where the vibrating sections 203 are arranged left and right in the X direction, the vibrating sections 203 are driven in antiphase (one is contracted while the other expands).

Note that as the vibrating section 203, a thin-film transparent piezoelectric member may be formed on the touch panel 102 by a method such as sputtering and used as the vibrating section 203. Where there is a cover member on the touch panel 102, the vibrating sections 203 may be attached to the cover member. Note that where there is a cover member on the touch panel 102, a panel member for detecting a touch position includes both the touch panel 102 and the cover member.

While the touch panel 102 to be touched by the user and the display section 101 for displaying an image are separate elements in this example, the touch panel 102 and the display section 101 may be formed as an integral member. For example, an in-cell type touch panel may be employed where the touch panel function is integrated inside a liquid crystal panel, or an on-cell type touch panel may be employed where the touch panel function is integrated on the surface of a liquid crystal panel.

3. Simulation Using Finite Element Method

The basic configuration of the electronic device 100 is substantially the same as that of the electronic device 100 described above. Like elements to those of the electronic device 100 described above will be denoted by like reference numerals, and will not be described redundantly.

Figure 5A:
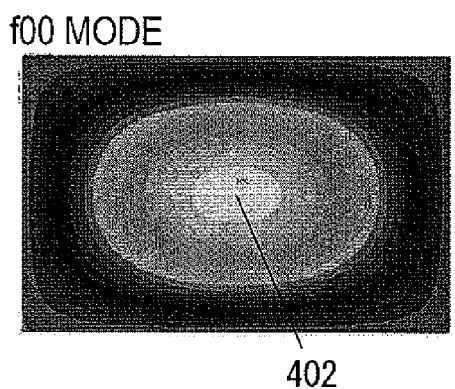
FIG. 5A is a vibration distribution map of the f00 mode according to an embodiment.
Figure 5B:
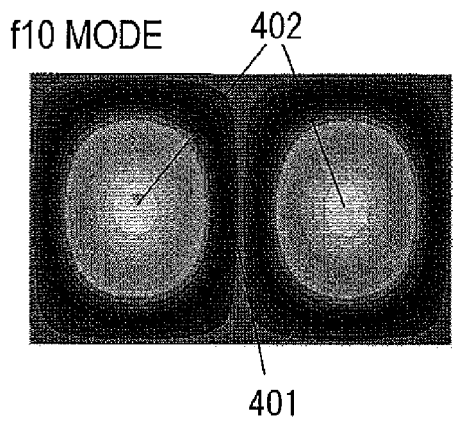
FIG. 5B is a vibration distribution map of the f10 mode according to an embodiment.

FIGS. 5A to 5H are vibration distribution maps calculated using the finite element method. The magnitude of amplitude is represented by contour lines. FIG. 5A shows a vibration distribution of the f00 mode. Similarly, FIG. 5B shows a vibration distribution of the f10 mode, FIG. 5C the f01 mode, FIG. 5D the f20 mode, FIG. 5E the f22 mode, FIG. 5F the f30 mode, FIG. 5G the f21 mode, and FIG. 5H the f02 mode.

The vibration modes are named so that the first figure attached to f is the number of nodes in the X direction, and the second figure is the number of nodes in the Y direction.

In FIG. 5A, the amplitude is largest in the central portion. In this case, the vibration mode is f00 since there is no vibration node in the X direction and the Y direction.

In FIG. 5B, since sets of concentric contour lines are arranged left and right in the X direction, there are two vibration antinodes 402 left and right. In the central portion of the display section 101 in the X direction, there is little vibration across the entire area in the Y direction. This portion is a vibration node 401. In this case, the vibration mode is f10 because there is one vibration node 401 in the X direction and there is no vibration node 401 in the Y direction.

Figure 5C:
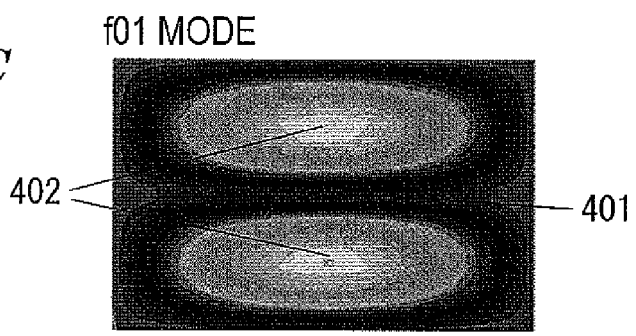
FIG. 5C is a vibration distribution map of the f01 mode according to an embodiment.
Figure 5D:
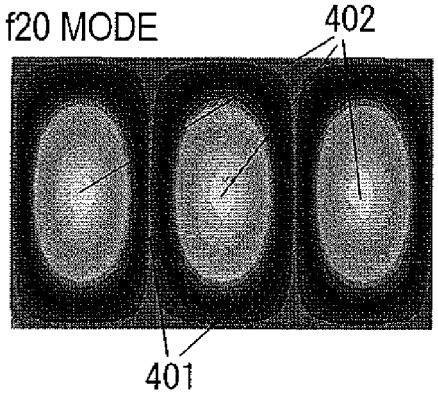
FIG. 5D is a vibration distribution map of the f20 mode according to an embodiment.
Figure 5E:
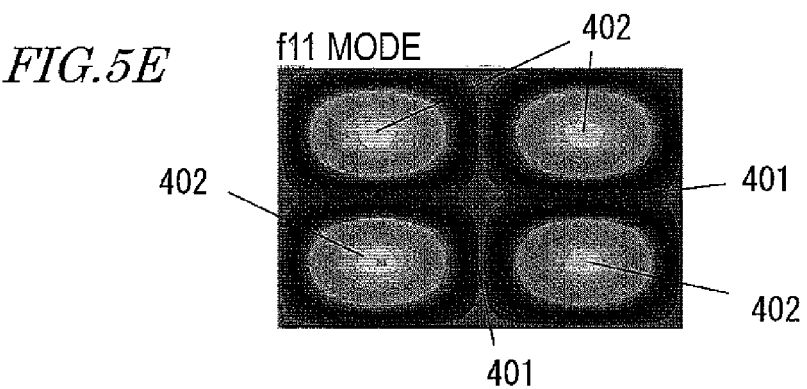
FIG. 5E is a vibration distribution map of the f11 mode according to an embodiment.
Figure 5F:
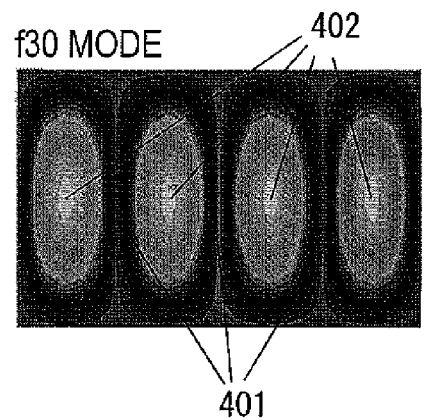
FIG. 5F is a vibration distribution map of the f30 mode according to an embodiment.
Figure 5G:
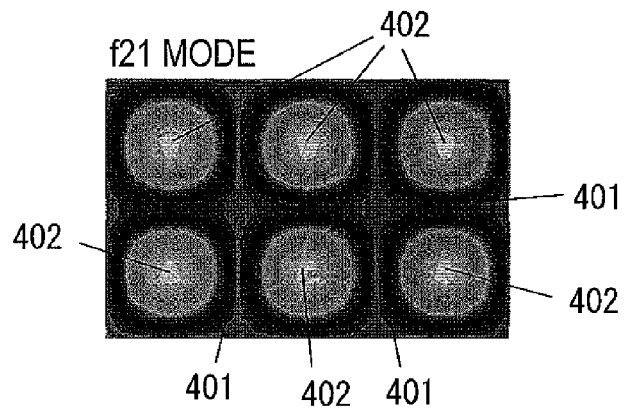
FIG. 5G is a vibration distribution map of the f21 mode according to an embodiment.
Figure 5H:
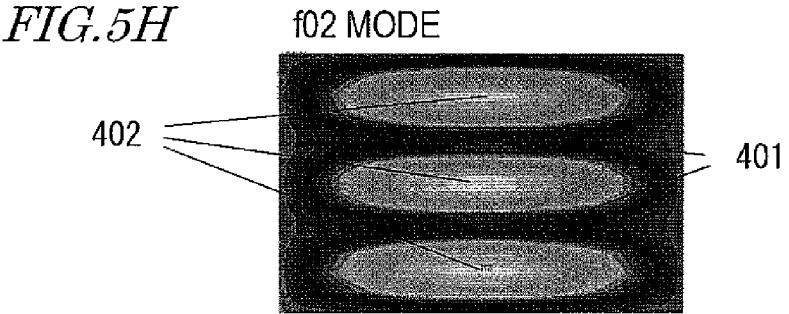
FIG. 5H is a vibration distribution map of the f02 mode according to an embodiment.

In FIG. 5C, two sets of concentric contour lines are arranged in the Y direction. The vibration mode is f01 because there is no vibration node in the X direction and there is one vibration node 401 in the Y direction similar to the case described above.

Among FIGS. 5A to 5H, the resonant frequency increases in the alphabetical order. That is, between the f10 mode and the f01 mode, which are both a primary mode, the resonant frequency is lower for the f10 mode. This is because the XY ratio of the display section 101 is greater for X. Since the resonant frequency is in inverse proportion to the length, the resonant frequency for the X direction is lower than the resonant frequency for the Y direction. If vibration modes sharing a node 401 at the same position are used, a necessary amplitude is not obtained by switching between the vibration modes; therefore, vibration modes sharing a node 401 at the same position should not be used. Thus, it is preferred to switch between vibration modes that have nodes 401 only in the X direction or in the Y direction and that have contiguous numbers of nodes 401 with respect to each other. That is, where the number of nodes in one vibration mode is N (N is a positive integer), the number of nodes in the other vibration mode is set to N+1. For example, switching may be done between the f20 mode and the f30 mode, or between the f01 mode and the f02 mode.

The rigidity of the support section 202 for the X direction side may differ from that for the Y direction side so as to produce nodes only in a single direction (the X direction or the Y direction). For example, when producing vibration nodes 401 only in the X direction, the rigidity of the support section 202a in the X direction is set to be lower than the rigidity of the support section 202b in the Y direction. Then, it will be easily bent in the X direction and less easily bent in the Y direction. Therefore, vibration nodes and antinodes are likely to be produced in the X direction. Conversely, when producing vibration nodes only in the Y direction, the rigidity of the support section 202b in the Y direction is set to be lower than the rigidity of the support section 202a in the X direction.

4. Operation

Figure 6A:
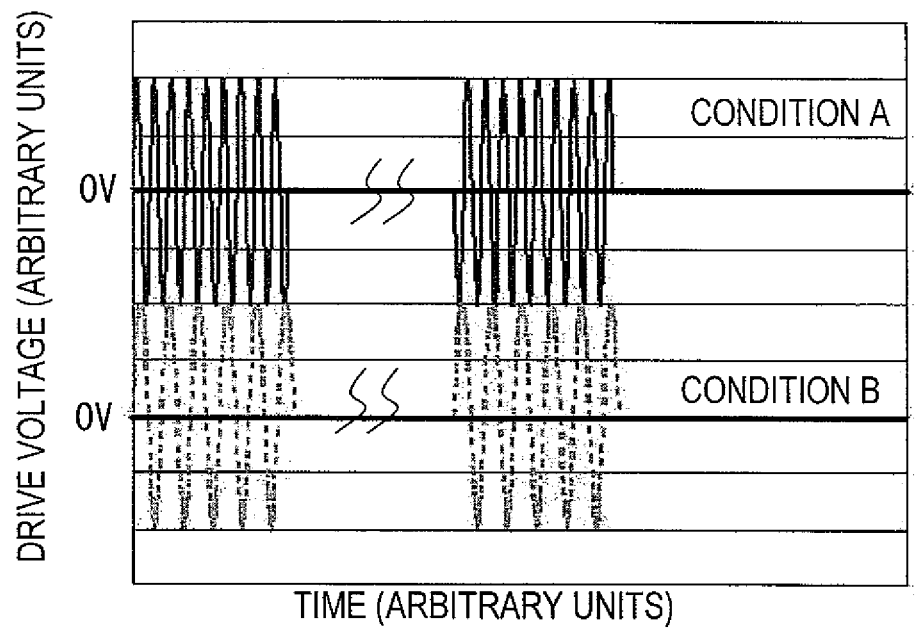
FIG. 6A is a diagram showing drive waveforms for driving operations to be performed depending on the touch position on a touch panel according to an embodiment.

Table 1 shows drive conditions for different touch positions. FIG. 6A shows the drive waveform for each condition. The operation will be described in detail using the table and the figure. The user touches the touch panel 102. Referring to values shown in Table 1, a microcomputer (not shown) sends a drive condition to the vibration control section 301 so that a uniform tactile sensation is presented to the user, depending on the touch position. The drive condition includes at least one of the drive voltage, the drive frequency, the phase, the waveform, the output timing, etc., for each of the vibrating sections 203a and 203b. The vibration control section 301 drives the vibrating sections 203 based on information from the microcomputer to present a tactile sensation to the user. Specifically, they are driven under condition A when the touch position touches area A of FIG. 4D, and under condition B when it touches area B.

TABLE 1

| | Drive condition | |
| --- | --- | --- |
| | Condition A | Condition B |
| Touch position | area A | area B |
| Frequency | 220 Hz | 370 Hz |
| Burst interval | 250 ms | 250 ms |
| Number of waves | 5 shots | 9 shots |
| Voltage | 150 V | 150 V |
| Phase | in phase | antiphase |

While the voltage is constant in this example, a more uniform tactile sensation may be presented by further dividing each area and adjusting the voltage. The voltage may be set so as to achieve tactile sensations of the same strength in accordance with the frequency characteristics of a human tactile sensation, instead of setting it so as to achieve the same amplitude for condition A and for condition B. Where a burst drive is used to give a clicking feel, the number of shots may be adjusted so as to achieve the same drive time.

Figure 6B:
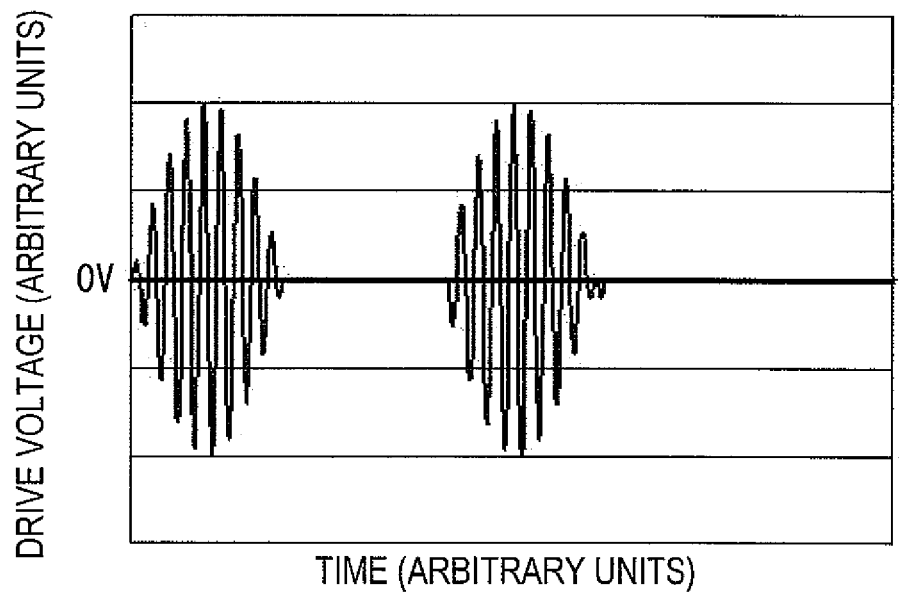
FIG. 6B is a diagram showing drive waveforms for driving operations to be performed depending on the touch position on a touch panel according to an embodiment.

FIG. 6B shows waveforms of which rising and falling edges are blunted in order to address noise. Where a finger of the user continuously moves (slides) on the touch panel 102, and where it is desired to present a continuous tactile sensation, the condition may be changed during intervals of the burst drive. That is, when the vibrating sections 203 are driven intermittently, the vibration mode may be switched to another while the vibration is stopped.

Where the drive method is a continuous drive, the microcomputer continuously sends the drive condition to the vibration control section 301 depending on the touch position.

Figure 6C:
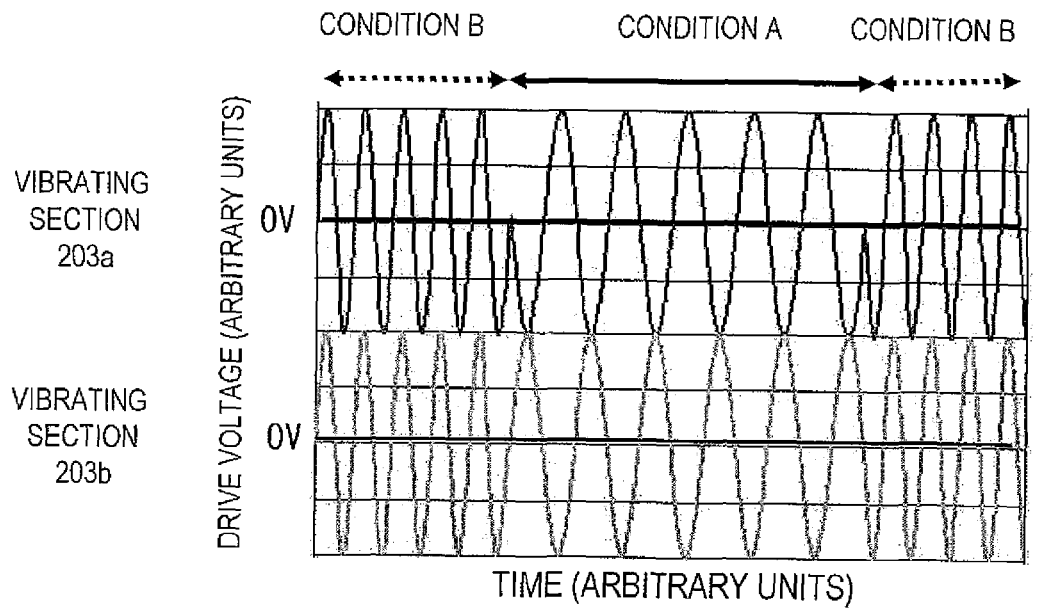
FIG. 6C is a drive waveform diagram for a continuous driving operation in which a finger touching a touch panel moves continuously while touching the touch panel according to an embodiment.

When the user moves the touch position while continuously touching the touch panel 102, the vibration control section 301 switches between two vibration modes so as to execute a vibration mode of which a node position is farther away from the current touch position during the move. Alternatively, it switches between two vibration modes so as to execute a vibration mode of which an antinode position is closer to the current touch position during the move. FIG. 6C shows a drive waveform for a continuous drive where a finger, which is continuously touching the touch panel 102, moves thereon. Then, the signal waveform actually output from the vibration control section 301 is adjusted so that the drive waveform changes continuously so that the user will not feel awkward. Specifically, when changing the drive condition from condition A to condition B when the touch position moves from area A to area B of FIG. 4D, the change is made aiming for a point in time when the output voltage is 0. In other words, parameters such as the amplitude, the frequency and the phase are changed at the zero-crossing point of the drive waveform. Thus, it is possible to prevent the user from feeling awkward and to prevent noise.

Where the user makes an operation using a plurality of fingers, if the optimal drive condition differs between those touch positions, vibrations are generated in time division. Specifically, where two fingers are in area A and in area B of FIG. 4D, the drive condition is switched between condition A and condition B continuously and alternately at regular intervals. Thus, the user can feel a tactile sensation on both fingers.

Where there are a plurality of vibrating sections 203, some of the vibrating sections may be stopped. Then, it is possible to reduce the power consumption. Where there are a plurality of vibrating sections 203, two drive conditions may be produced at the same time. For example, the vibrating section 203a may be driven under drive condition A while driving the vibrating section 203b under drive condition B. Thus, two vibration modes are produced at the same time. Note however that care is taken so as not to produce another vibration mode due to coupling between two resonant modes.

A plurality of vibrating sections 203 may be arranged evenly among the four sides of the touch panel 102, or a plurality of sets may be arranged only along the short sides or only along the long sides. Alternatively, one may be arranged along each of a short side and a long side.

Regarding the drive phase, while examples of the same phase (phase difference: 0 degree) and the antiphase (phase difference: 180 degrees) have been shown, an arbitrary phase difference other than 0 degree and 180 degrees may be set so as to adjust to the optimal quantity, e.g., to maximize or minimize the vibration amplitude at a particular position of the touch panel 102.

The vibration control section 301 may vibrate the vibrating sections 203a and 203b with a waveform obtained by modulating the envelope of the sinusoidal wave using an arbitrary waveform, in addition to the use of a sinusoidal wave. Then, the user is allowed to feel various tactile sensations, such as hard, soft, rough, etc.

5. Another Embodiment

Figure 7:
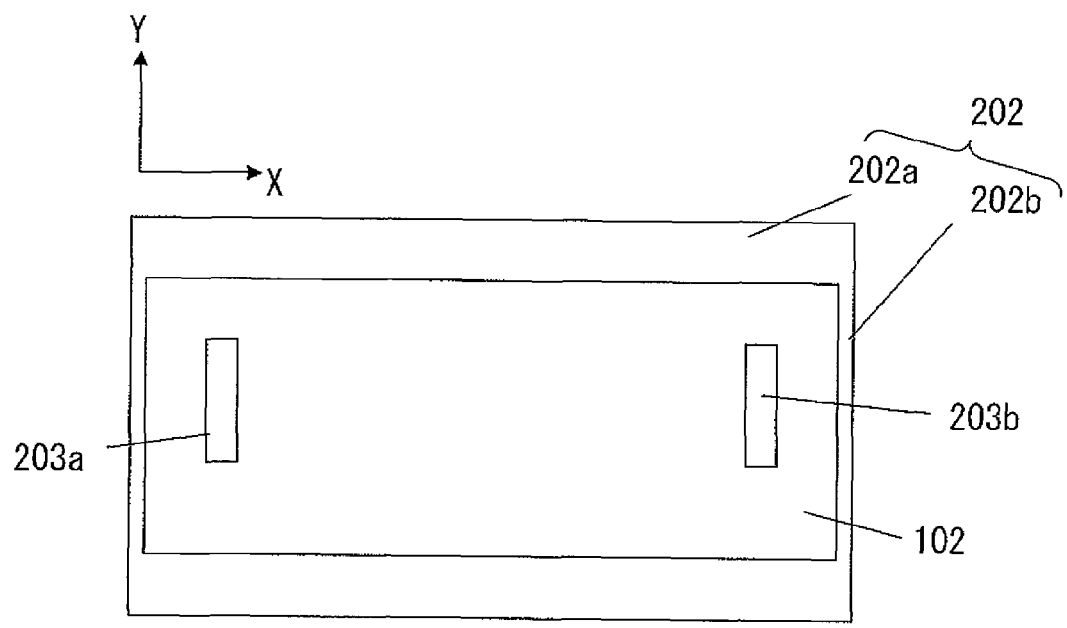
FIG. 7 is a plan view showing a display section of an electronic device according to an embodiment.

FIG. 7 is a plan view of another embodiment of the electronic device 100. The support section 202 includes the support section 202a in the X direction and the support section 202b in the Y direction. The rigidity of the support section 202a in the X direction is higher than the rigidity of the support section 202b in the Y direction. This weakens the production of nodes 401 in the X direction, thus making the resonance less defined. That is, by making the difference between vibration antinodes and nodes indefinite, it is possible to reduce the area where no tactile sensation is felt.

6. Summary

The electronic device 100 according to the present embodiment includes the touch panel 102 to be touched by the user, the vibrating section 203 for vibrating the touch panel 102 in the first vibration mode and in the second vibration mode, and the vibration control section 301 for controlling the vibration of the vibrating section 203. The number of vibration nodes occurring on the touch panel 102 in the first vibration mode is different from the number of vibration nodes occurring on the touch panel 102 in the second vibration mode. The vibration control section 301 vibrates the touch panel 102 in at least one of the first vibration mode and the second vibration mode depending on the touch position of the user.

Thus, the user can feel a vibration wherever the user touches on the touch panel 102. Thus, it is possible to reduce variation in tactile sensation between different touch positions.

The vibration control section 301 controls the vibration so that where the number of nodes in the first vibration mode is N, the number of nodes in the second vibration mode is N+1, for example.

The positions of nodes on the touch panel 102 in the first vibration mode may differ from the positions of nodes on the touch panel 102 in the second vibration mode, and the vibration control section 301 vibrates the touch panel 102 while selecting one of the first vibration mode and the second vibration mode of which the position of a vibration node is farther away from the touch position of the user, for example.

When the user moves the touch position while continuously touching the touch panel 102, the vibration control section 301 switches between the first vibration mode and the second vibration mode so as to execute one of the first vibration mode and the second vibration mode of which the position of a vibration node is farther away from the current touch position, for example.

The positions of vibration antinodes occurring on the touch panel 102 in the first vibration mode may differ from the positions of vibration antinodes occurring on the touch panel 102 in the second vibration mode, and the vibration control section 301 vibrates the touch panel 102 while selecting one of the first vibration mode and the second vibration mode of which the position of a vibration antinode is closer to the touch position of the user, for example.

When the user moves the touch position while continuously touching the touch panel 102, the vibration control section 301 switches between the first vibration mode and the second vibration mode so as to execute one of the first vibration mode and the second vibration mode of which the position of a vibration antinode is closer to the current touch position, for example.

Thus, the user can feel a vibration wherever the user touches on the touch panel 102. Thus, it is possible to reduce variation in tactile sensation between different touch positions.

For example, the vibration control section 301 switches between the first vibration mode and the second vibration mode continuously and alternately.

Then, even if the user touches different positions with a plurality of fingers, the user can feel vibrations with the fingers.

The electronic device 100 may further include a casing 201, and first and second support sections 202a and 202b for supporting the touch panel 102 against the casing 201. The first support section 202a and the second support section 202b extend in directions perpendicular to each other, and the first support section 202a may have a higher rigidity than the second support section 202b.

Thus, a flexural vibration occurs less easily in the direction in which the first support section 202a extends whereas a vibration occurs easily in the direction in which the second support section 202b extends, and vibration nodes are produced only in one direction, so that a vibration node is unlikely to occur at the same position when a plurality of vibrations are combined together. Thus, the user can feel a vibration wherever the user touches on the touch panel 102. Thus, it is possible to reduce variation in tactile sensation between different touch positions.

The electronic device 100 may further include the display section 101 for displaying an image, and the vibrating sections 203 are arranged outside the image display range of the display section 101 and are arranged at positions closer to antinodes than to nodes of vibration in the first and second vibration modes, for example.

Thus, it is possible to efficiently induce both vibration modes. Therefore, it is possible to obtain an intended amplitude with a small device.

The vibration control section 301 may drive the vibrating sections 203 intermittently, wherein the switching between the first vibration mode and the second vibration mode is done while the vibration is stopped, for example.

Thus, it is possible to switch drive conditions from one to another while the vibrating sections 203 are not vibrating. Therefore, even if a condition is changed, it is possible to suppress noise, or the like.

The vibration control section 301 may drive the vibrating section 203 continuously, wherein the switching between the first vibration mode and the second vibration mode is done while the drive voltage applied to the vibrating section 203 is 0, for example.

Thus, it is possible to switch conditions from one to another while the vibrating section 203 is not vibrating. Therefore, even if a condition is changed, it is possible to suppress noise, or the like.

The electronic device 100 may include a plurality of vibrating sections 203, wherein the vibration control section 301 vibrates a first vibrating section 203 in the first vibration mode and vibrates a second vibrating section 203 in the second vibration mode, and simultaneously vibrates the first vibrating section 203 in the first vibration mode and the second vibrating section 203 in the second vibration mode, for example.

Then, even if the user touches different positions with a plurality of fingers, the user can feel vibrations with the fingers.

As described above, embodiments have been described above as an example of the technique disclosed in the present application. However, the technique of this disclosure is not limited thereto, but is also applicable to other embodiments in which changes, replacements, additions, omissions, etc., are made as necessary. Different ones of the elements described in the embodiments described above may be combined together to obtain a new embodiment.

While the embodiments above are directed to a tablet-type information terminal device as an example of the electronic device, the electronic device is not limited thereto. For example, the electronic device may be any electronic device including a touch panel, such as a mobile telephone, a PDA, a game device, a computer display, a car navigation, an ATM, a ticket vending machine, etc.

While a tactile sensation is presented by generating vibrations in the embodiments above, the technique of the present disclosure is not limited thereto. Tactile sensations may be presented by combining vibration with another method, e.g., a variation of friction using static electricity, a skin stimulation using electric current, and a variation of screen shape using liquid. In addition to presenting a tactile sensation, screen display, sound, light, heat, etc., may be used in combination as necessary.

Note that the vibration control operation according to the embodiments of the present disclosure may be implemented by means of hardware or software. A computer program implementing such a vibration control operation is stored, for example, in an internal memory of a microcomputer or in a storage medium provided separately from the microcomputer. The vibration control section may store such a computer program. Such a computer program may be installed onto the electronic device from a storage medium (an optical disc, a semiconductor memory, etc.) storing the computer program, or may be downloaded via a telecommunications network such as the Internet.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein.

Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The present disclosure is applicable to an electronic device that can be operated by a user, for example.

What is claimed is:

1. An electronic device comprising:
a panel member touched by a user;
a vibrator vibrates the panel member in a first vibration mode and a second vibration mode; and
a vibration controller controls the vibration of the vibrator,
wherein the number of vibration nodes occurring on the panel member in the first vibration mode is different from the number of vibration nodes occurring on the panel member in the second vibration mode,
wherein the vibration controller selects one of the first vibration mode and the second vibration mode depending on a touch position of the user, and vibrates the panel member in the selected vibration mode, and
wherein, while a finger of the user continuously touches the panel member, the vibration controller drives the vibrator intermittently, and switching between the first vibration mode and the second vibration mode is done while the vibration is stopped.

2. The electronic device of claim 1, wherein where the number of nodes in the first vibration mode is N (N is a positive integer), the number of nodes in the second vibration mode is N+1.

3. The electronic device of claim 1, wherein:
a position of the node on the panel member in the first vibration mode is different from a position of the node on the panel member in the second vibration mode; and
the vibration controller vibrates the panel member while selecting one of the first vibration mode and the second vibration mode of which the position of the vibration node is farther away from the touch position of the user.

4. The electronic device of claim 3, wherein when the user moves the touch position while continuously touching the panel member, the vibration controller switches between the first vibration mode and the second vibration mode so as to execute one of the first vibration mode and the second vibration mode of which the position of the vibration node is farther away from a current touch position.

5. The electronic device of claim 1, wherein:
a position of a vibration antinode occurring on the panel member in the first vibration mode is different from a position of a vibration antinode occurring on the panel member in the second vibration mode; and
the vibration controller vibrates the panel member while selecting one of the first vibration mode and the second vibration mode of which the position of the vibration antinode is closer to the touch position of the user.

6. The electronic device of claim 5, wherein when the user moves the touch position while continuously touching the panel member, the vibration controller switches between the first vibration mode and the second vibration mode so as to execute one of the first vibration mode and the second vibration mode of which the position of the vibration antinode is closer to a current touch position.

7. The electronic device of claim 1, wherein the vibration controller switches between the first vibration mode and the second vibration mode continuously and alternately.

8. The electronic device of claim 1, further comprising:
a casing; and
a first and a second support section for supporting the panel member against the casing, wherein:
the first support section and the second support section extend in directions perpendicular to each other; and
the first support section has a higher rigidity than the second support section.

9. The electronic device of claim 1, further comprising:
a display for displaying an image;
the vibrator is arranged outside an image display range of the display and is arranged at a position closer to an antinode than to a node of vibration in the first and second vibration modes.

10. The electronic device of claim 1, wherein:
a plurality of vibrators are provided;
the vibration controller vibrates a first vibrator of the plurality of vibrators in the first vibration mode;
the vibration controller vibrates a second vibrator of the plurality of vibrators in the second vibration mode; and
the vibration controller simultaneously vibrates the first vibrator in the first vibration mode and the second vibrator in the second vibration mode.

11. The electronic device of claim 1, further comprising:
a display for displaying an image, wherein:
the vibrator is arranged outside an image display range of the display and is arranged at a position closer to an antinode than to a node of vibration in the first and second vibration modes.

12. The electronic device of claim 11, further comprising:
a casing; and
a first and a second support section for supporting the panel member against the casing, wherein:
the first support section and the second support section extend in directions perpendicular to each other; and
the first support section has a higher rigidity than the second support section.

13. The electronic device of claim 1, wherein
the controller controls a first drive voltage applied to the vibrator in the first vibration mode and a second drive voltage applied to the vibrator in the second vibration mode so as to achieve tactile sensations of the same strength in accordance with the frequency characteristics of a human tactile sensation in both the first vibration mode and the second vibration mode.

14. An electronic device comprising:
a panel member touched by a user;
a vibrator vibrates the panel member in a first vibration mode and a second vibration mode; and
a vibration controller controls the vibration of the vibrator,
wherein the number of vibration nodes occurring on the panel member in the first vibration mode is different from the number of vibration nodes occurring on the panel member in the second vibration mode,
wherein the vibration controller selects one of the first vibration mode and the second vibration mode depending on a touch position of the user, and vibrates the panel member in the selected vibration mode, and
wherein, while a finger of the user continuously touches the panel member, the vibration controller drives the vibrator continuously, and switching between the first vibration mode and the second vibration mode is done while a drive voltage applied to the vibrator is 0.

15. The electronic device of claim 14, wherein
the controller controls a first drive voltage applied to the vibrator in the first vibration mode and a second drive voltage applied to the vibrator in the second vibration mode so as to achieve tactile sensations of the same strength in accordance with the frequency characteristics of a human tactile sensation in both the first vibration mode and the second vibration mode.

16. A non-transitory computer-readable medium having stored thereon a computer program for instructing an electronic device to perform a vibration operation, the computer program instructing the electronic device to perform the steps of:
accepting a touch operation by a user to detect a touch position; and
vibrating a panel member touched by the user in a first vibration mode and a second vibration mode;
wherein the number of vibration nodes occurring on the panel member in the first vibration mode is different from the number of vibration nodes occurring on the panel member in the second vibration mode;
wherein the vibrating step includes a step of selecting one of the first vibration mode and the second vibration mode depending on the touch position of the user, and vibrating the panel member in the selected vibration mode; and
wherein, while the touch operation of the user is continuously detected, the panel member is vibrated intermittently, and switching between the first vibration mode and the second vibration mode is done while the vibration is stopped.

* * * * *